UNITED STATES PATENT OFFICE.

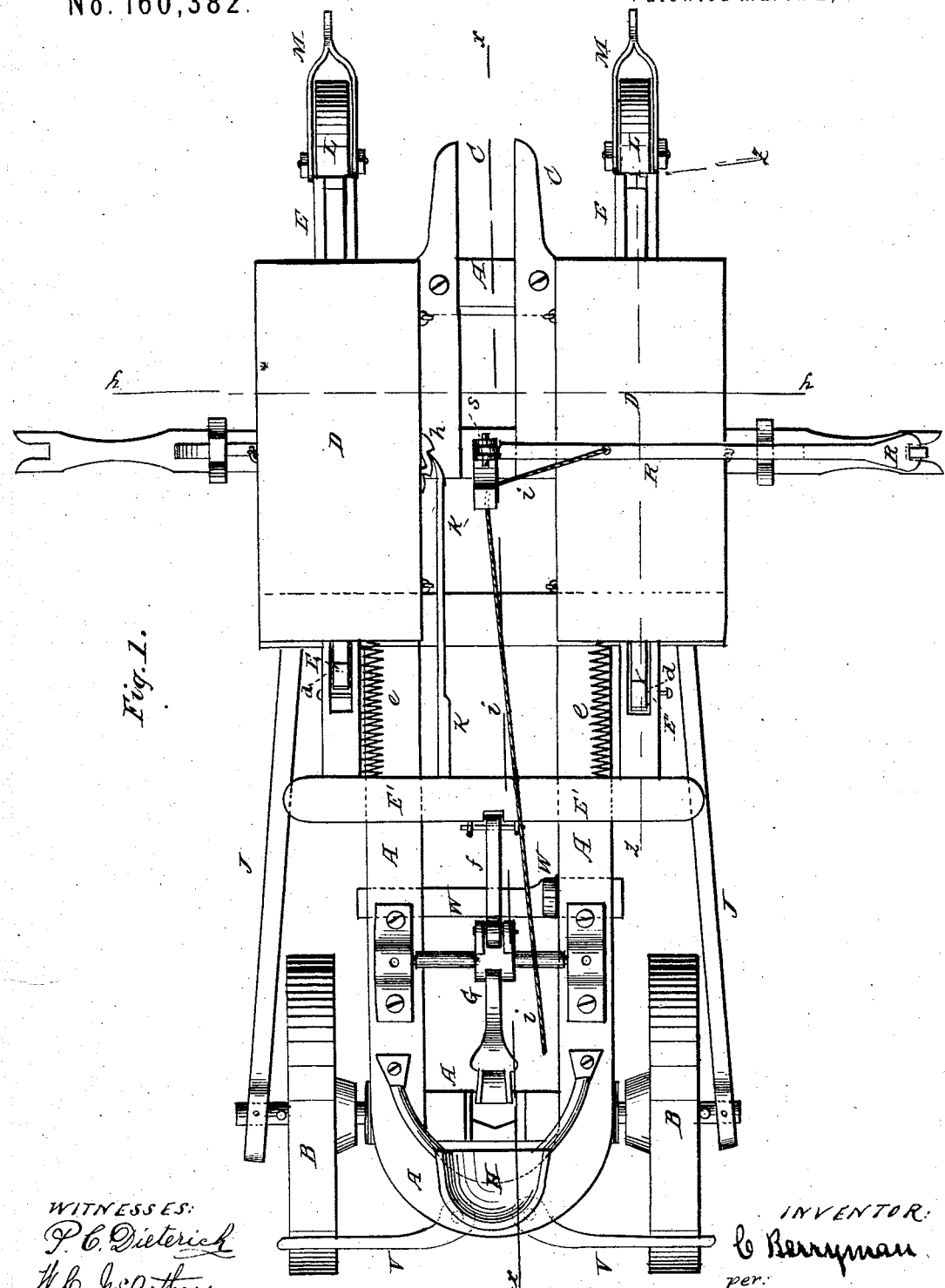

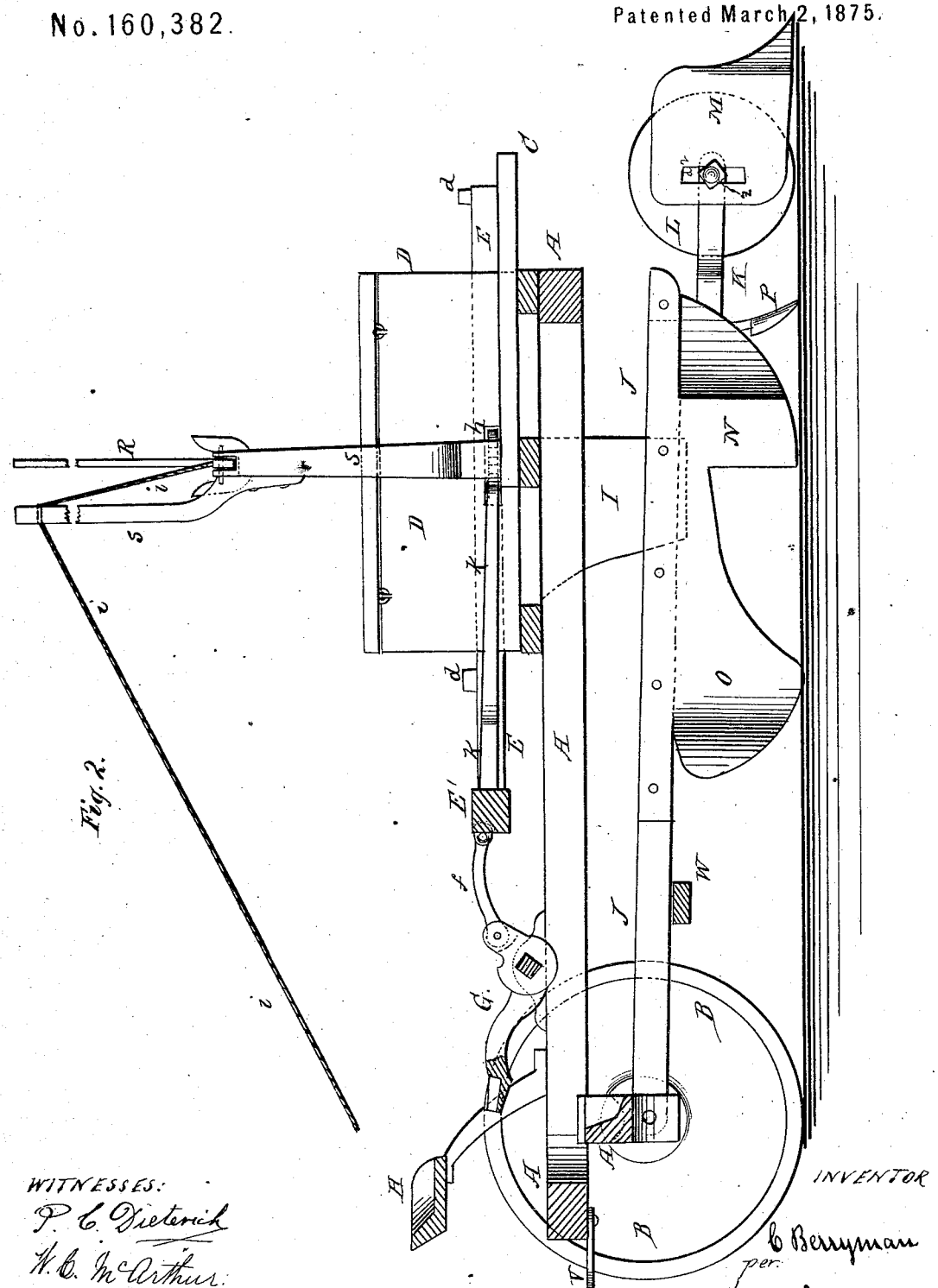

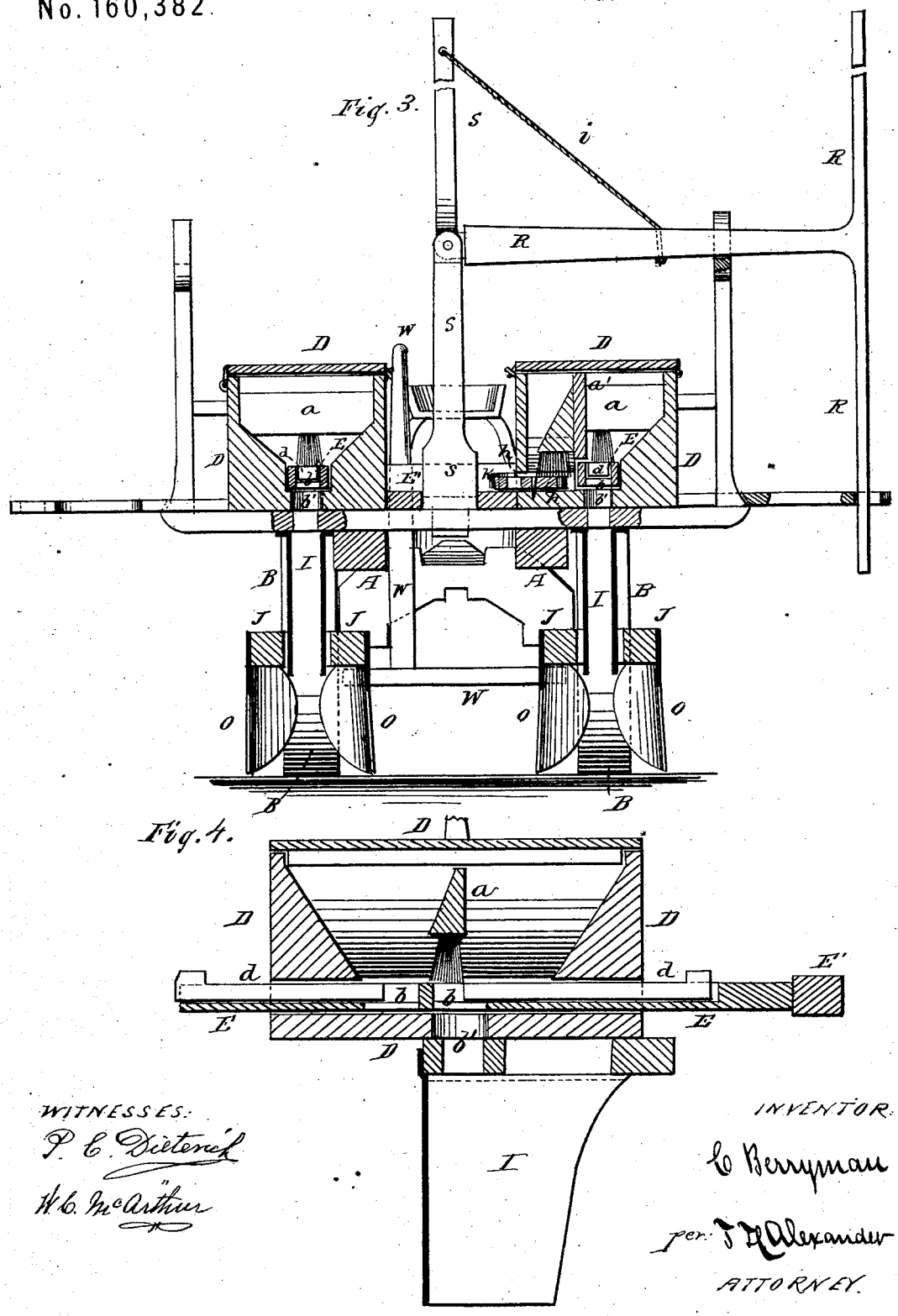

CRATON BERRYMAN, OF JUDA, WISCONSIN.

IMPROVEMENT IN CORN-PLANTERS.

Specification forming part of Letters Patent No. 160,382, dated March 2, 1875; application filed January 2, 1875.

*To all whom it may concern:*

Be it known that I, CRATON BERRYMAN, of Juda, in the county of Green and State of Wisconsin, have invented certain new and useful Improvements in Corn-Planters; and I do hereby declare that the following is a full, clear, and exact description thereof, reference being had to the accompanying drawings, and to the letters of reference marked thereon, which form a part of this specification.

The nature of my invention consists in the construction and arrangement of a corn-planter, as will be hereinafter more fully set forth.

In order to enable others skilled in the art to which my invention appertains to make and use the same, I will now proceed to describe its construction and operation, referring to the annexed drawings, in which—

Figure 1 is a plan view of my invention. Fig. 2 is a central vertical section on line $x$ $x$, Fig. 1. Fig. 3 is a cross-section on line $y$ $y$, Fig. 1; and Fig. 4 is a central vertical section through one of the boxes D on line $z$ $z$, Fig. 1.

A represents the main frame of my machine, constructed in any suitable manner, and of required size and shape, for the purposes intended. The rear end of this frame is attached to a suitable axle-tree provided with spindles, upon which the wheels B B are placed. The front end of the frame A is provided with the tongue C, for the attachment of the team. On top of the frame A, at the front end, are secured the two corn-boxes D D, each of which is, by a vertical cross-partition, $a$, divided in two chambers. In the bottom of each corn-box D is a longitudinal slide, E, provided with two apertures, $b$ $b$, the size of which is regulated by means of slides $d$ $d$. The rear ends of the slides E E are connected by means of a cross-bar, E', and this cross-bar is, by spiral springs $e$ $e$, connected with the corn-boxes, thereby throwing the slides forward. The cross-bar E' is, by a rod, $f$, connected with an elbow foot-lever, G, pivoted in the frame A, and so arranged that the driver, seated on the seat H above the axle, can put his foot thereon and operate the dropping-slides at proper intervals. The corn in the boxes or apertures $b$ falls through an aperture, $b'$, in the bottom of the box and through a conductor, I. These conductors are made long and narrow and open in the rear, so that when the corn leaves the bottom of the corn-box it will not be carried along with the machine, but will be dropped at the proper places. One of the corn-boxes D is divided by a longitudinal partition, $a'$, so as to form a compartment for pumpkin-seed, in the bottom of which compartment is a revolving dropping-wheel, $h$, provided on its periphery with four, six, or eight ratchet-teeth, and to the cross-bar E' is attached a spring-pawl, $k$, to take into said ratchet-wheel and turn the same, so as to drop pumpkin-seed every fourth, sixth, or eighth hill.

On the spindles of the axle-tree are placed beams J J, one on each side of each wheel, which extend forward, and the front ends of each two side beams are connected together, forming, as it were, a frame, in which or through which the conductor I projects. At the front end of each frame J J projects a metallic frame, K, in which a wheel, L, is adjustable vertically up and down by means of the slot $d^2$ and bolt $z$, thereby enabling the operator to plant deep or shallow, as desired. In front of the gage-wheels L, and covering the front parts thereof, are dividers M, to move loose stones and other obstructions from in front of the wheels. To each frame J J is attached a plow, constructed as shown, to form dividers N in front of the point where the corn is dropped, and coverers O in rear thereof. In front of the dividing-shovels N is a small shovel, P, to make a deep furrow. To a center standard, S, is pivoted a guide, R, which may be changed from side to side as the machine is turned around. This guide is operated by means of a cord, $i$, at the will of the operator.

In planting, the shovel P and dividers N make the furrow for the corn, the coverers O cover it, and the wheels B following behind press the dirt onto the corn.

To the rear end of the frame A are attached scrapers V, for cleaning the wheels; and in said frame is pivoted a T-shaped lever, W, to raise the shovel-frames when turning around.

By this machine the corn will be dropped and planted at the same depth on uneven ground as well as even ground, and one man can drive and operate the planting mechanism with his foot at the same time.

Having thus fully described my invention, what I claim as new, and desire to secure by Letters Patent, is—

1. In combination with a corn-box, D, having a pumpkin-seed compartment, the revolving ratchet dropping-wheel $h$ and pawl $k$, arranged to operate substantially as and for the purposes herein set forth.

2. The dividers M, provided with slot $d^2$, in combination with wheels L, bolt $z$, and adjustable frame K.

3. The combination of the frame J J, pivoted to the axle of the adjustable gage-wheel L, with dividers M, shovel P, dividers N, and coverers O, all constructed substantially as and for the purposes herein set forth.

In testimony that I claim the foregoing as my own I affix my signature in presence of two witnesses.

CRATON BERRYMAN.

Witnesses:
    M. H. PENGRA,
    W. R. GREENE.